(12) United States Patent
Nakiri et al.

(10) Patent No.: US 8,016,645 B2
(45) Date of Patent: Sep. 13, 2011

(54) CHAMFERING APPARATUS FOR CHAMFERING GLASS SUBSTRATES

(75) Inventors: Kazuhiro Nakiri, Shizuoka (JP); Yoshio Kawakami, Saitama (JP); Tetsuo Suzuki, Tokyo (JP)

(73) Assignees: The Furukawa Electric Co., Ltd., Tokyo (JP); Shoda Techtron Corp., Hamamatsu-shi (JP)

( * ) Notice: Subject to any disclaimer, the term of this patent is extended or adjusted under 35 U.S.C. 154(b) by 0 days.

(21) Appl. No.: 12/861,519

(22) Filed: Aug. 23, 2010

(65) Prior Publication Data

US 2010/0317265 A1     Dec. 16, 2010

Related U.S. Application Data

(60) Division of application No. 12/224,821, filed on Oct. 3, 2008, now Pat. No. 7,798,889, which is a continuation of application No. PCT/JP07/072199, filed on Nov. 15, 2007.

(30) Foreign Application Priority Data

Nov. 15, 2006 (JP) ................. 2006-308532

(51) Int. Cl.
  *B24B 7/24*   (2006.01)
  *B24B 9/02*   (2006.01)
(52) U.S. Cl. .......................... 451/180; 451/44
(58) Field of Classification Search .............. 451/43, 451/44, 51, 52, 57, 58, 61, 177, 178, 180, 451/190, 194
See application file for complete search history.

(56) References Cited

U.S. PATENT DOCUMENTS

| | | | |
|---|---|---|---|
| 3,683,885 A | 8/1972 | Kikuchi | |
| 4,063,471 A | 12/1977 | Nowak | |
| 4,228,617 A | 10/1980 | Bando | |
| 4,535,570 A | 8/1985 | Ochiai et al. | |
| 4,862,868 A | 9/1989 | Dodd et al. | |
| 4,991,353 A | 2/1991 | Wiener | |
| 5,099,617 A | 3/1992 | Bovone | |
| 5,149,337 A | 9/1992 | Watanabe | |
| 5,327,686 A | 7/1994 | Park | |
| 6,752,699 B2 | 6/2004 | Yanagisawa et al. | |
| 2003/0017789 A1 | 1/2003 | Yanagisawa et al. | |

FOREIGN PATENT DOCUMENTS

| | | |
|---|---|---|
| JP | 59-7562 | 1/1984 |
| JP | 09-181021 | 7/1997 |
| JP | 10-329037 | 12/1998 |
| JP | 2001-129750 | 5/2001 |
| JP | 2002-355740 | 12/2002 |
| JP | 2003-231044 | 8/2003 |
| JP | 2004-050345 | 2/2004 |

*Primary Examiner* — Timothy V Eley
(74) *Attorney, Agent, or Firm* — Oblon, Spivak, McClelland, Maier & Neustadt, L.L.P.

(57) ABSTRACT

A chamfering apparatus is used to chamfer a peripheral edge of a glass substrate. The chamfering apparatus includes a grindstone having a cylindrical hollow end portion; a grindstone driving unit that rotates the grindstone around an axis of the cylindrical hollow end portion; a substrate rotation-driving unit that rotates the glass substrate around either one of an axis of the outer periphery and an axis of the center circular hole; and a pressing unit that presses the grindstone to the glass substrate such that an annular end surface of the grindstone contacts with an edge of either one of the outer periphery and the inner periphery of the glass substrate while the cylindrical hollow end portion of the grindstone faces with one of the outer periphery and the inner periphery of the glass substrate.

1 Claim, 8 Drawing Sheets

CHAMFERING APPARATUS FOR CHAMFERING GLASS SUBSTRATES

CROSS-REFERENCE TO RELATED APPLICATIONS

This application is a divisional of U.S. patent application Ser. No. 12/244,821, filed Oct. 3, 2008, which is a continuation of International Patent Application No. PCT/JP2007/072199, filed on Nov. 15, 2007, and claims priority to Japanese Patent Application No. 2006-308532, filed Nov. 15, 2006. The entire contents of these applications are incorporated herein by reference.

BACKGROUND OF THE INVENTION

1. Field of the Invention

The present invention relates to a chamfering apparatus for chamfering glass substrates used for recording media disks of hard disk drives or wafers for semiconductor devices.

2. Description of the Related Art

Information terminal devices, such as cell phones and portable music players, equipped with a high-capacity hard disk are now available. There has been a requirement to increase the capacity and reduce the size of a magnetic disk that is a recording medium used in a hard disk drive. To fulfill such a requirement, these days a glass substrate is used as a substrate of a magnetic disk used in a hard disk drive instead of a conventional aluminum alloy substrate.

The glass substrate is machined into a disk shape having a circular hole at the center. However, inner and outer peripheral edges of the glass substrate are prone to be cracked due to an internal stress. Therefore, chamfering is performed on the inner and outer peripheral edges of the glass substrate. Chamfering is performed on a peripheral edge of even a single crystal silicon wafer for a semiconductor device to suppress cracking, chipping, or a breakage during a delivery process or a device process. For example, Japanese Patent Application Laid-open No. 2003-231044 discloses a chamfering technology for chamfering a glass substrate.

Figure 13:
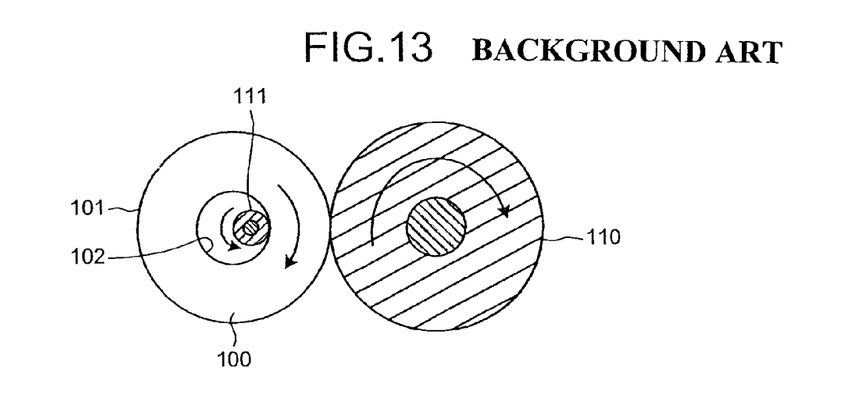
FIG. 13 is a schematic diagram for explaining a grinding operation according to a conventional chamfering apparatus.
Figure 14:
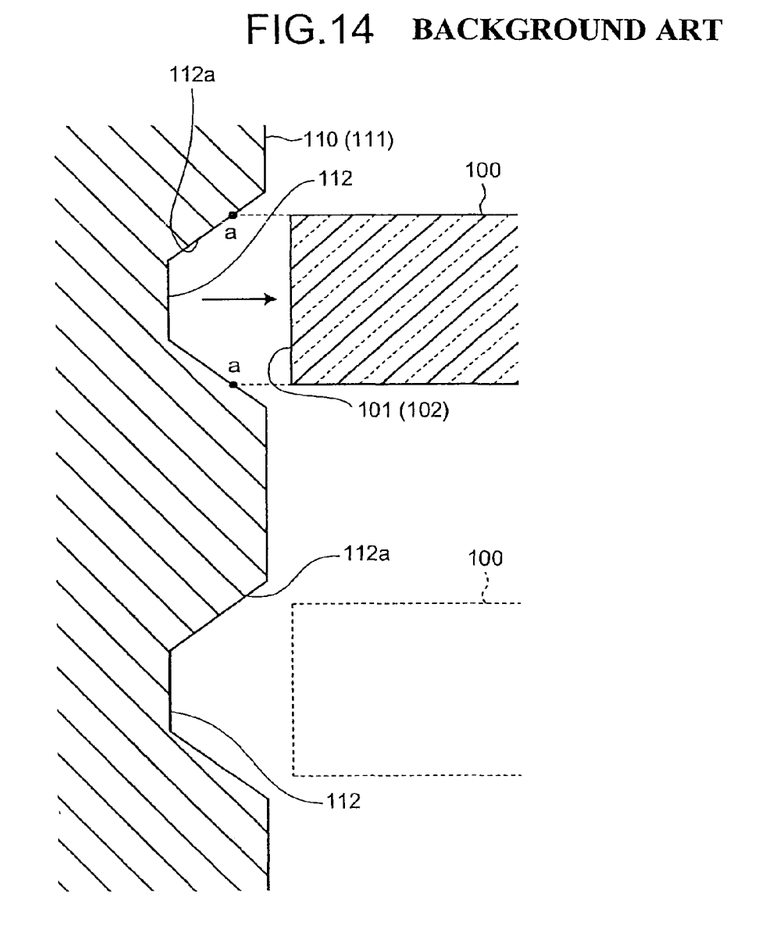
FIG. 14 is a sectional view for explaining grinding grooves formed in the conventional chamfering apparatus.

In the Japanese Patent Application Laid-open No. 2003-231044, as shown in FIG. 13, chamfering is performed in such a manner that outer peripheries of cylindrical rotary grindstones 110 and 111 are pressed toward an outer end surface 101 and an inner end surface 102 of a disk-shaped glass substrate 100 while the glass substrate 100 is rotated. As shown in FIG. 14, a plurality of grinding grooves 112 is formed along the entire circumferences of the rotary grindstones 110 and 111. Each of the grinding grooves 112 tapers toward a groove bottom. Moreover, grinding grain, such as diamond grain, is adhered on the inner surface of the grinding groove 112. A tapered surface 112a of the grinding groove 112 contacts with the outer end surface 101 or the inner end surface 102 of the glass substrate 100, so that the inner end surface and the outer end surface are ground because of friction and the edge portions are chamfered. Japanese Patent Application Laid-open No. H9-181021 also discloses beveling of a wafer by employing a similar chamfering method to the above.

However, as shown in FIG. 14, at a portion "a" that is in contact with an edge of the glass substrate 100, scarring (liner concavity) is formed on the periphery of the tapered surface 112a. When such scarring is formed, replacement of the grinding groove 112 used for grinding the glass substrate 100 is required (for example, the grinding groove 112 on a lower stage is used). Alternatively, dressing of the rotary grindstones 110 and 111 is needed. Thus, management of grindstones is complicated in the conventional grinding device. Furthermore, replacing the grinding groove 112 may change grinding conditions, and vary grinding finishes. Because the glass substrate 100 contacts with the outer peripheries of the rotary grindstones 110 and 111 always on the same trajectory, chipping may easily occur in a region ranging from the chamfered portion to the surface of the glass substrate 100. Moreover, strip scarring may be formed easily on the grinded surface. Particularly, because high precision machining is required for glass substrates used as information recording media, finishing defects at a boundary of the grinded surface and the glass substrate surface, and finishing defects at the grinded surface can cause trouble.

SUMMARY OF THE INVENTION

It is an object of the present invention to at least partially solve the problems in the conventional technology.

According to an aspect of the present invention, there is provided a chamfering apparatus that chamfers at least one of edges of either one of an outer periphery and an inner periphery of a glass substrate, the glass substrate being either one of a disk shape and a disk shape having a center circular hole. The chamfering apparatus includes a grindstone having a cylindrical hollow end portion; a grindstone driving unit that rotates the grindstone around an axis of the cylindrical hollow end portion; a substrate rotation-driving unit that rotates the glass substrate around either one of an axis of the outer periphery and an axis of the center circular hole; and a pressing unit that presses the grindstone to the glass substrate such that an annular end surface of the grindstone contacts with an edge of either one of the outer periphery and the inner periphery of the glass substrate while the cylindrical hollow end portion of the grindstone faces with one of the outer periphery and the inner periphery of the glass substrate.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
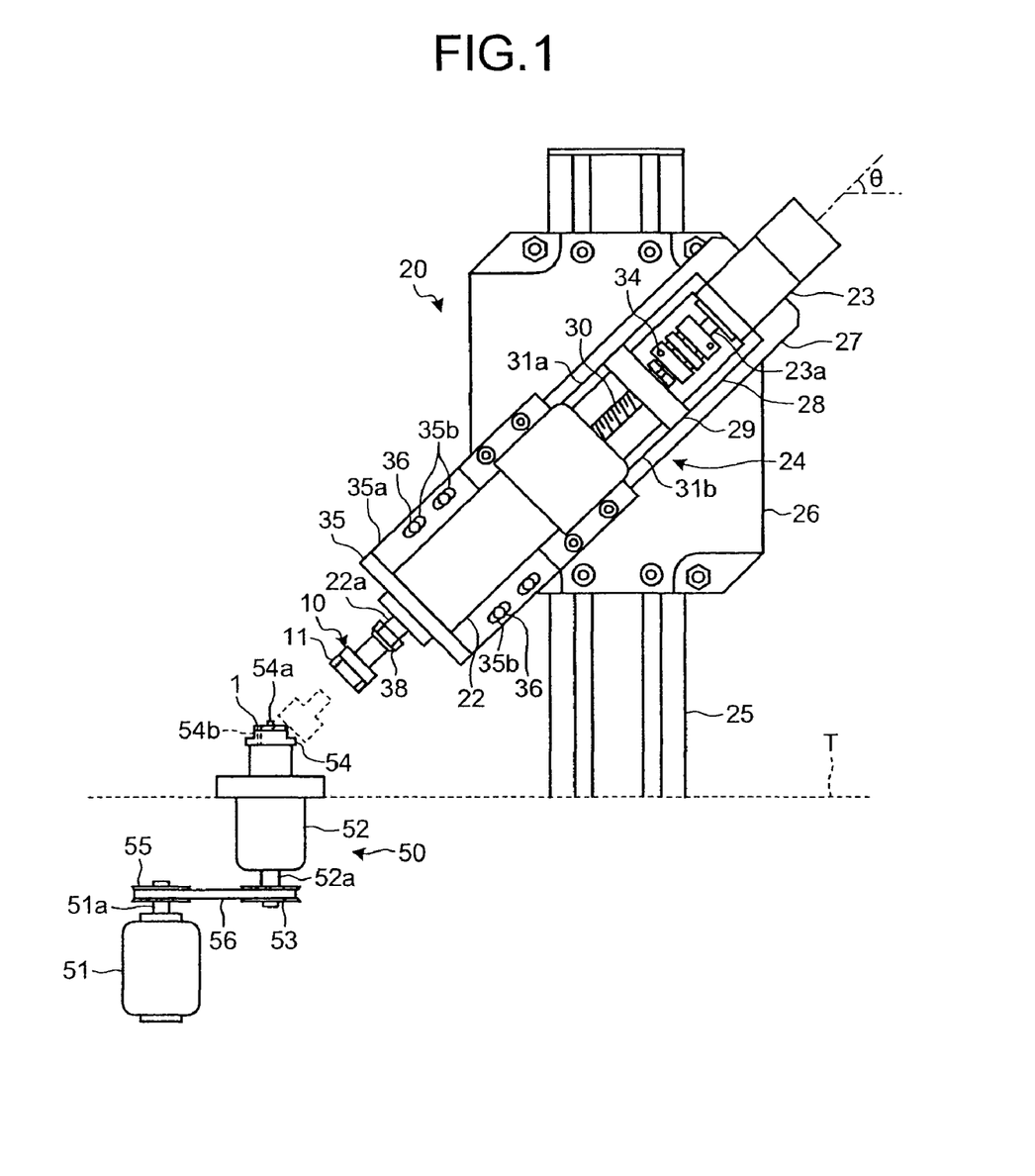
FIG. 1 is a front view of a chamfering apparatus for chamfering a glass substrate used for a recording media according to an embodiment of the present invention.

Exemplary embodiments of a chamfering apparatus for chamfering a glass substrate used for a recording media according to the present invention are explained in detail below with reference to the accompanying drawings. FIG. 1 is a schematic diagram of a chamfering apparatus for chamfering a glass substrate used for a recording media according to an embodiment.

A chamfering apparatus according to the embodiment performs chamfering on an outer peripheral surface of a disk-shaped glass substrate 1 having a circular hole in the center and used for a recording media. The chamfering apparatus mainly includes a grindstone driving unit 20 and a substrate rotation-driving unit 50.

The grindstone driving unit 20 includes a grindstone rotation motor 22 as a grindstone driving unit, a grindstone retractable motor 23 as a pressing unit, and a slide mechanism 24. The grindstone rotation motor 22 rotates a rotary grindstone 10. The grindstone retractable motor 23 presses the rotary grindstone 10 to an edge (edge of a top surface) of an outer periphery of the glass substrate 1 by moving the grindstone rotation motor 22 backward and forward.

The grindstone driving unit 20 includes a supporting member 25 that extends upwardly from a work table T. A support plate 26 is firmly attached to the supporting member 25 such that a plate surface of the support plate 26 is perpendicular. A mounting plate 27 for housing the grindstone retractable motor 23 and the slide mechanism 24 is obliquely mounted in the support plate 26 relative to the longitude of the support plate 26. The mounting plate 27 is rotatably supported on a center of the mounting plate 27 with respect to the support plate 26 so that a longitudinal angle θ of the mounting plate 27 can be adjusted. Furthermore, the mounting plate 27 is locked with a lock mechanism (not shown) at the predetermined angle θ. The grindstone retractable motor 23 is fixed to one side of the mounting plate 27 with a bracket 28. The slide mechanism 24 is fixed to the other side of the mounting plate 27.

Figure 2:
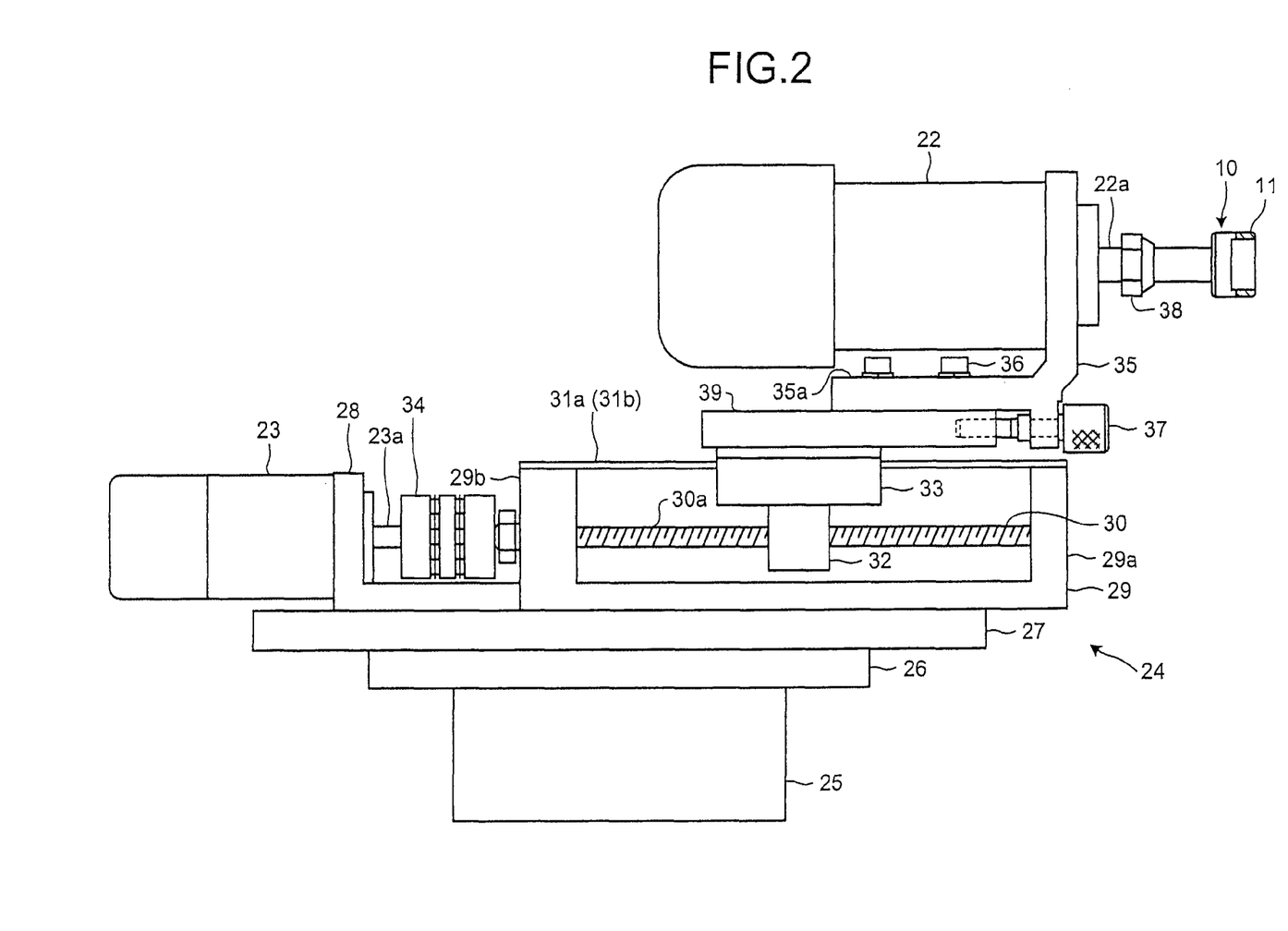
FIG. 2 is a plan view of a grindstone driving unit of the chamfering apparatus for a glass substrate used for a recording media according to the embodiment.

FIG. 2 is a plan view of the grindstone driving unit 20 when the mounting plate 27 is in a horizontal state. As shown in FIG. 2, the slide mechanism 24 includes a frame body 29 fixed to the mounting plate 27, a ball screw 30 rotatably supported by the frame body 29, two rails 31a and 31b arranged on the top of the frame body 29 in parallel to the ball screw 30, a ball-screw nut 32 having a female screw (not shown) engaged with a male screw 30a formed in the ball screw 30, and a slide member 33 firmly attached to the ball-screw nut 32 and slidably supported on the rails 31a and 31b.

The ball screw 30 is coupled to an output shaft 23a of the grindstone retractable motor 23 through a coupling member 34. The ends of the ball screw 30 are rotatably supported by a bearing (not shown) that is placed on a front frame 29a and a back frame 29b of the frame body 29. The rotation of the ball-screw nut 32 is regulated because the ball-screw nut 32 is firmly fixed to the slide member 33. Accordingly, a rotational motion of the ball screw 30 driven by the grindstone retractable motor 23 is converted into a linier motion in an axial direction of the ball-screw nut 32. The slide member 33 slides backward and forward on the rails 31a and 31b as the ball-screw nut 32 performs a liner motion.

Figure 3:
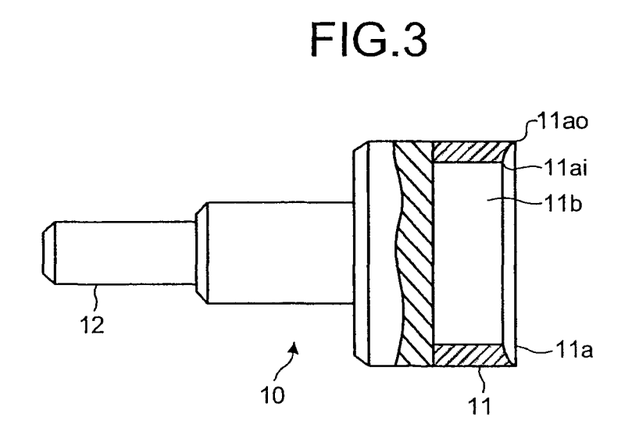
FIG. 3 is a partial sectional front view of a rotary grindstone (for chamfering an outer periphery) according to the embodiment.
Figure 4:
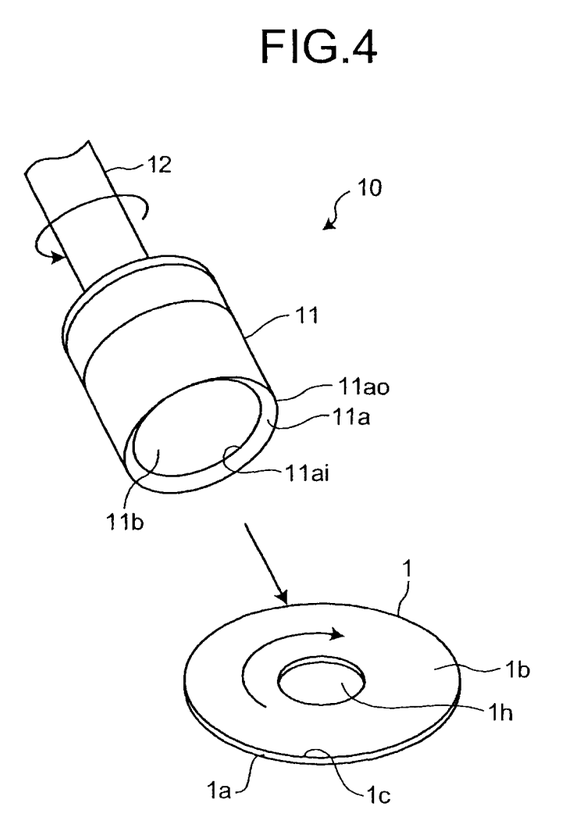
FIG. 4 is a schematic diagram for explaining approach of the rotary grindstone (for chamfering the outer periphery) toward the glass substrate according to the embodiment.

A plate 39 is firmly fixed onto a top surface of the slide member 33. The grindstone rotation motor 22 is firmly fixed to the plate 39 via a bracket 35. The bracket 35 includes a plate 35a that is overlaid on and detachably attached to the plate 39 with bolts 36 that are inserted into four slots 35b (see FIG. 1). Two slots 35b are provided in each of the two sides of the plate 35a. Furthermore, an adjustment bolt 37 is provided in the bracket 35 for adjusting a mounting position of the grindstone rotation motor 22 with respect to the plate 39. After loosening the bolts 36 that are inserted into the slots 35b, rotating of the adjustment bolt 37 for adjusting the position of the bracket 35 enables adjustment of the mounting position in an axial direction of the grindstone rotation motor 22 with respect to the plate 39. An output shaft of the grindstone rotation motor 22 is coupled to the rotary grindstone 10 through a collet chuck 38. As shown in FIGS. 3 and 4, the rotary grindstone 10 includes a cylindrical grindstone body 11 (hereinafter, "grindstone 11") that contacts with an outer peripheral surface 1a of the glass substrate 1 and grinds a top edge 1c of the glass substrate 1, and a grindstone shaft 12 that is coupled to an output shaft 22a of the grindstone rotation motor 22. The grindstone 11 is concentrically fixed to a tip of the grindstone shaft 12.

The grindstone 11 is formed in a cylindrical shape with a hollow portion 11b therein. An annular surface 11a, which is an end surface (hereinafter, "annular end surface 11a") of the grindstone 11, is used as a grinding surface. The annular end surface 11a is made to contact with the edge 1c of the outer periphery of the glass substrate 1 in a situation that a grindstone rotation axis center is tilted at a predetermined angle θ with respect to a top surface 1b (main surface) of the glass substrate 1. In this state, the hollow portion 11b on the tip of the grindstone 11 touches with the edge 1c of the outer periphery of the glass substrate 1. An entire surface of the annular end surface 11a, i.e., from an outer diameter 11ao to an inner diameter 11ai, has a curvature scaling up toward a tip outer diameter and scaling down toward an inner side. Grain, such as diamond grain, is adhered to the annular end surface 11a.

Meanwhile, as shown in FIG. 1, the substrate rotation-driving unit 50 includes a substrate rotation motor 51 and a spindle unit 52 that rotates the glass substrate 1 by a rotating torque transmitted from the substrate rotation motor 51. A rotation shaft 52a is rotatably supported by a bearing (not shown) mounted within a casing of the spindle unit 52. The spindle unit 52 is firmly fixed to the work table T such that the rotation shaft 52a is perpendicular to the work table T. A pulley 53 is coupled to a lower end of the rotation shaft 52a, and a substrate mounting base 54 that receives the glass substrate 1 is mounted at an upper end of the rotation shaft 52a.

A pulley 55 is fixed on an output shaft 51a of the substrate rotation motor 51. The pulley 55 is coupled to the pulley 53 of the spindle unit 52 with a timing belt 56 so that the rotating torque from the substrate rotation motor 51 is transmitted to the rotation shaft 52a of the spindle unit 52. The substrate rotation motor 51 is fixed on a frame of an apparatus body with a bracket (not shown).

The substrate mounting base 54 is provided at the tip of the rotation shaft 52a of the spindle unit 52, and the substrate mounting base 54 receives a guide rod 54a that is inserted into a center of the substrate mounting base 54. The guide rod 54a is inserted into a circular hole 1h of the glass substrate 1 thereby performing positioning the glass substrate 1. The glass substrate 1 can be firmly held on the substrate mounting base 54 by pressing the top surface 1b of the glass substrate 1 from upward of the top surface 1b. In the embodiment of the present invention, however, to fix the glass substrate 1 to the substrate mounting base 54, a top surface of the substrate mounting base 54 is provided with an opening as an air suction port 54b for sucking a back side of the glass substrate 1 by a negative pressure generator (not shown).

Next, a chamfering method for the glass substrate 1 using the chamfering apparatus is explained in detail. In the embodiment, the glass substrate 1, which is to be processed, is a doughnut-shaped glass disk and having a thickness of 0.381 mm, an outer diameter of 21.60 mm, and an inner diameter of 6.00 mm. The glass substrate 1 is used for a magnetic disk of a hard disk drive.

In performing chamfering, one glass substrate 1 is placed on the substrate mounting base 54. After the glass substrate 1 is firmly held onto the substrate mounting base 54, the substrate rotation motor 51 is driven to rotate the substrate mounting base 54 of the spindle unit 52. As a result, the glass substrate 1 rotates around the circular hole 1h.

In the state of rotating the rotary grindstone 10 by driving the grindstone rotation motor 22, as shown in FIG. 4, by controlling the driving of the grindstone retractable motor 23, the rotary grindstone 10 is moved forward to a predetermined position, whereby the annular end surface 11a presses the edge 1c of the outer periphery of the glass substrate 1. As a result, the edge 1c of the outer periphery of the glass substrate 1 is ground. Rotational directions of the rotary grindstone 10 and the glass substrate 1 are set in the directions for accelerating the grazing speeds.

Figure 5:
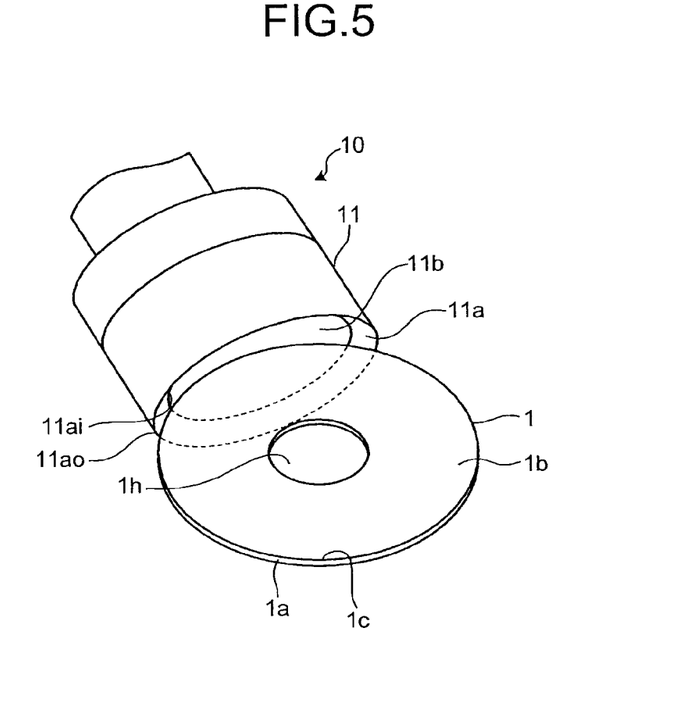
FIG. 5 is a perspective view for explaining a contact state of the rotary grindstone (for chamfering the outer periphery) with the glass substrate according to the embodiment.

As shown in FIG. 5, in a state of the hollow portion 11b that opens toward the grindstone 11 faces the outer peripheral surface 1a of the glass substrate 1, the annular end surface 11a is made to contact with the edge 1c of the outer periphery of the glass substrate 1. Because the annular end surface 11a of the grindstone 11 has an inner concave curvature shape, the edge 1c of the outer periphery of the glass substrate 1 contacts with substantially the entire surface from the outer diameter 11ao to the inner diameter 11ai. Therefore, grinding can be performed using a wide area of the grinding stone. Furthermore, the rotational moving direction of the outer peripheral surface 1a of the glass substrate and the rotational moving direction of the annular end surface 11a of the grindstone 11 are not in parallel. Namely, both of the rotational moving directions intersect with each other. Consequently, scarring in a specific direction is not formed on the annular end surface 11a. Furthermore, strip scarring is not formed in a grinded surface 1d of the glass substrate 1.

Figure 6:
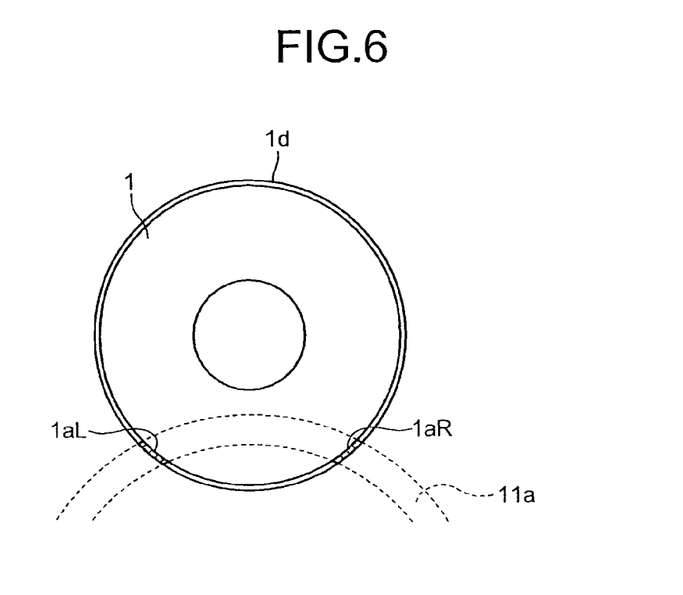
FIG. 6 is a schematic diagram for explaining contacting portions between the glass substrate and the rotary grindstone (for chamfering the outer periphery) according to the embodiment.
Figure 7:
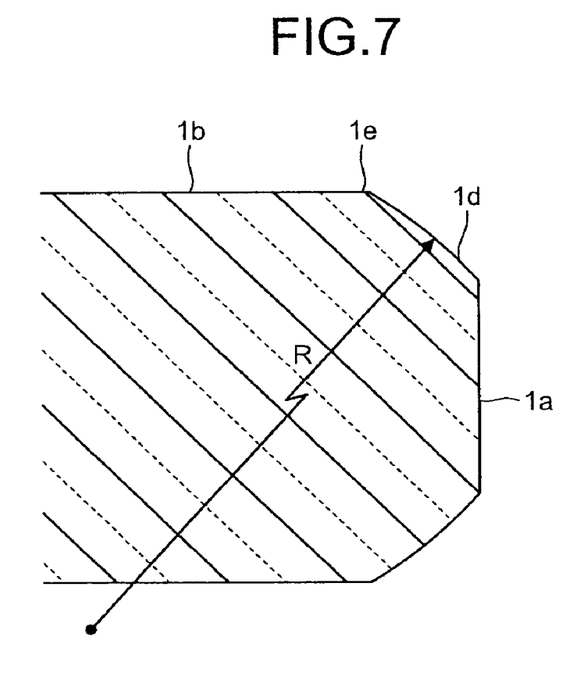
FIG. 7 is a sectional view of an outer peripheral edge of the glass substrate according to the embodiment.

As shown in FIG. 6, a right side and a left side that are located across the hollow portion 11b of the annular end surface 11a of the grindstone concurrently grind the glass substrate 1 so that the grinding directions on the left-side and right-side grinded portions 1dL and 1dR differ from each other. Because the grinding directions differ, a self-dressing effect is achieved, and grain clogging is suppressed and annular scarring is not formed whereby chipping hardly occurs. Because the annular end surface 11a of the grindstone 11 has an inner concave curvature, as shown in FIG. 7, the grinded surface 1d of the glass substrate 1 that is grinded by the grindstone 11 has an externally convex gentle curvature. Therefore, cracking hardly occurs at a boundary 1e of the top surface 1b and the grinded surface 1d of the glass substrate 1. Thus, reliability, durability, and a yield rate of the glass substrate 1 can be improved. Even if strip scarring is formed at the left grinded portion 1dL of the glass substrate 1, those scarring will be erased at the right grinded portion 1dR. In this regard, finishing precision of chamfering of the grinded surface 1d (chamfered surface) of the glass substrate 1 can be improved.

Furthermore, because a wide grinding area is used for grinding, grinding can be performed effectively and the grinding time can be shortened. In addition, even if grinding by the grindstone 11 is continuously performed, a state of the inner concave curvature of the annular end surface 11a does not change. Therefore, chamfering under constant conditions can be performed and management of the grindstone becomes easy.

After completion of grinding of the top surface 1b side of the glass substrate 1, similar grinding is performed on a reverse side of the glass substrate 1 after reversing the glass substrate. In this manner, chamfering of the top and bottom edges of the outer peripheral surface 1a of the glass substrate is completed.

Next, a chamfering apparatus used for chamfering an inner peripheral surface of a glass substrate is explained in detail below. The chamfering apparatus used for chamfering the inner peripheral surface of the glass substrate has the same structure as the above-stated chamfering apparatus for chamfering the outer peripheral surface except that the structures of the rotary grindstone and the mounting base of the spindle unit are different.

Figure 8:
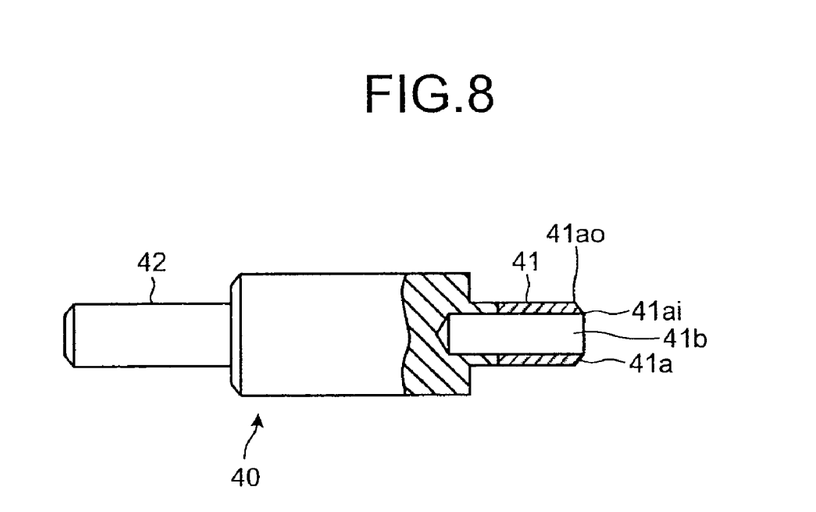
FIG. 8 is a partial sectional front view of a rotary grindstone (for chamfering an inner periphery) according to the embodiment.
Figure 9:
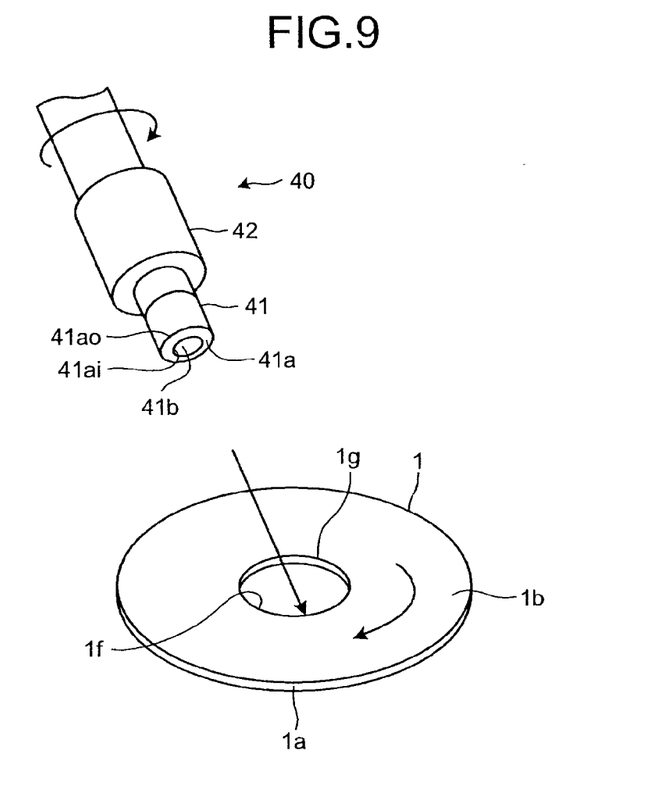
FIG. 9 is a schematic diagram for explaining approach of the rotary grindstone (for chamfering the inner periphery) toward the glass substrate according to the embodiment.

As shown in FIGS. 8 and 9, a rotary grindstone 40 for chamfering an inner peripheral surface includes a cylindrical grindstone body 41 (hereinafter, "grindstone 41") that contacts with an inner peripheral surface 1f of the glass substrate 1 and grinds an edge 1g of a top surface of the glass substrate 1, and a grindstone shaft 42 that is coupled to the output shaft 22a of the grindstone rotation motor 22. The grindstone 41 is concentrically fixed to a tip of the grindstone shaft 42.

The grindstone 41 is formed in a cylindrical shape with a hollow portion 41b therein. An annular surface 41a, which is an end surface (hereinafter, "annular end surface 41a") of the grindstone 41, is used as a grinding surface. The annular end surface 41a is made to contact with the inner peripheral surface 1f of the glass substrate 1 in a situation that a grindstone rotation axis center is tilted at a predetermined angle θ with respect to the top surface 1b (main surface) of the glass substrate 1. In this state, the hollow portion 41b on the tip of the grindstone 41 touches with the inner peripheral surface 1f of the glass substrate 1. An entire surface of the annular end surface 41a, i.e., from an outer diameter 41ao to an inner diameter 41ai, has a curvature scaling up toward an outer diameter and scaling down toward a tip along a side surface of a truncated cone. Grain, such as diamond grain, is adhered to the annular end surface 41a.

Figure 10:
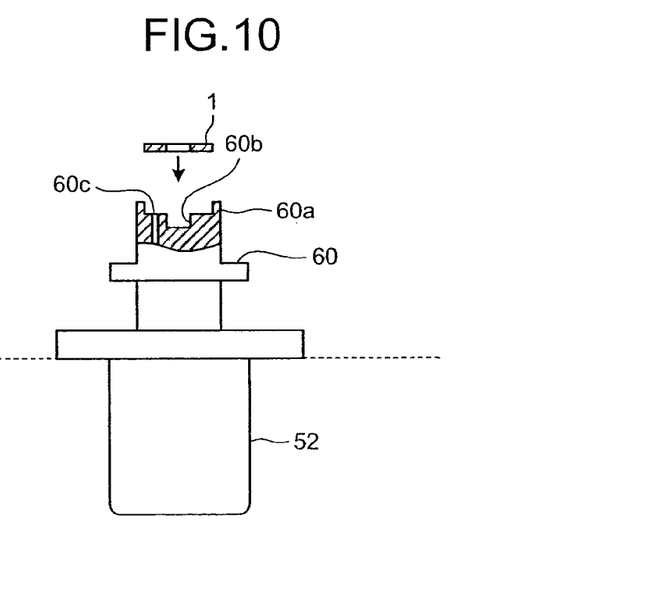
FIG. 10 is a partial sectional front view of a spindle unit (for chamfering the inner periphery) according to the embodiment.

Meanwhile, as shown in FIG. 10, a cylindrical wall 60a is provided in a substrate mounting base 60 of the spindle unit 52. The cylindrical wall 60a guides and performs positioning of the outer peripheral edge of the glass substrate 1 to fit around the cylindrical wall 60a. Furthermore, in a center portion of the substrate mounting base 60, a concave portion 60b is formed such that a tip of the grindstone 41 does not hit the substrate mounting base 60. A top surface of the substrate mounting base 60 has an opening for an air suction port 60c for sucking a backside of the glass substrate 1 by a negative pressure generator (not shown) to firmly fix the glass substrate 1 onto the substrate mounting base 60.

Chamfering of the inner peripheral surface if of the glass substrate 1 is performed in the same manner as the above-stated chamfering of the outer peripheral surface 1a. In other words, while one glass substrate 1 is firmly held on the substrate mounting base 60, the substrate rotation motor 51 is driven to rotate the glass substrate 1. In this state, as shown in FIG. 9, the annular end surface 41a of the rotary grindstone 40, which is driven by the grindstone rotation motor 22, is pressed toward the edge 1g of the inner periphery of the glass substrate 1 by controlling the driving of the grindstone retractable motor 23.

Figure 11:
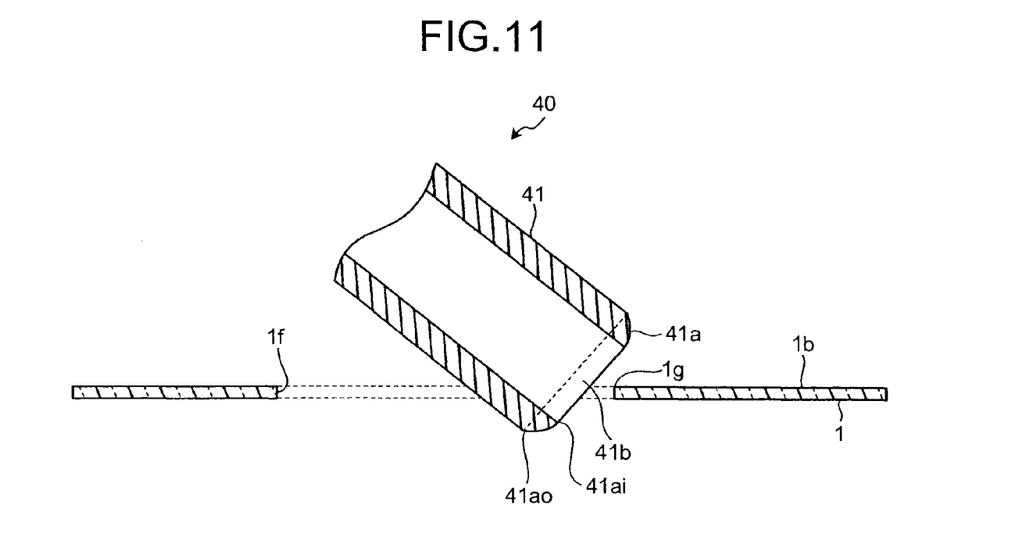
FIG. 11 is a sectional view for explaining a contact state of the rotary grindstone (for chamfering the inner periphery) with the glass substrate according to the embodiment.

In this state, as shown in FIGS. 9 and 11, the annular end surface 41a of the grindstone 41 contacts with the edge 1g of the inner periphery of the glass substrate 1 such that the hollow portion 41b that opens toward the tip of the grindstone 41 faces the inner peripheral surface 1f of the glass substrate 1. In this state, because of the curved shape of the annular end surface 41a of the grindstone 41, an entire surface of the annular end surface 41a from the outer diameter 41ao to the inner diameter 41ai can contact with the edge 1g of the inner periphery of the glass substrate 1.

Therefore, similarly to the chamfering apparatus for chamfering the outer peripheral surface described above, chamfering using a wider grindstone area can be achieved. Moreover, a rotational moving direction of the inner peripheral surface 1f of the glass substrate 1 and a rotational moving direction of the annular end surface 41a of the grindstone 41 are not in parallel. Thus, scarring in a specific direction is hardly formed on the annular end surface 41a of the grindstone 41. Moreover, strip scarring is hardly formed on a grinded surface 1i of the glass substrate 1.

Figure 12:
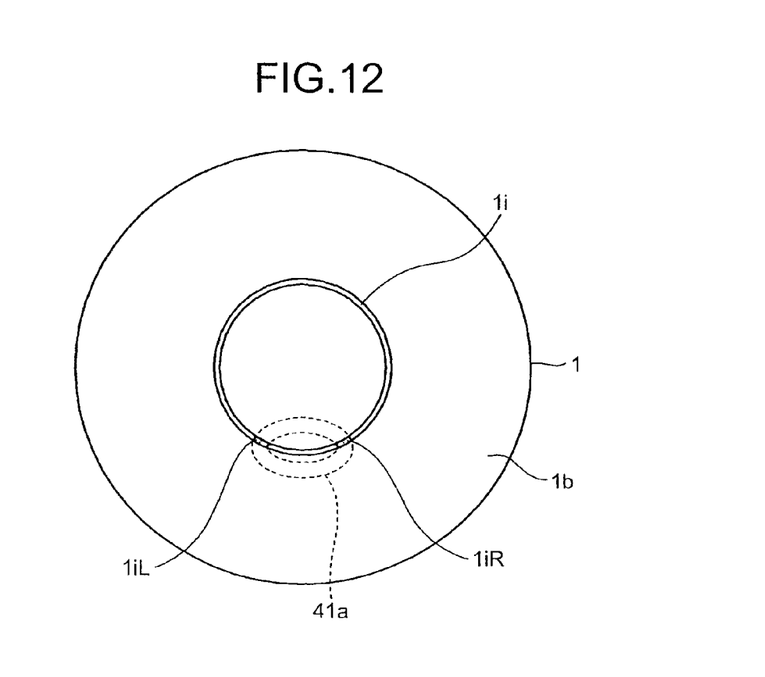
FIG. 12 is a schematic diagram for explaining contacting portions between the glass substrate and the rotary grindstone (for chamfering the inner periphery) according to the embodiment.

Furthermore, as shown in FIG. 12, a right side and a left side that are located across the hollow portion 41b of the annular end surface 41a concurrently grind the glass substrate 1 so that the grinding directions on a left-side grinded portion 1iL and a right-side grinded portion 1iR differ from each other. As explained in with respect to the chamfering of the outer periphery of the glass substrate 1, because the grinding directions differ, grain clogging is suppressed and consequently chipping occurrence is suppressed. Even if strip scarring is formed at the left-side grinded portion 1iL of the glass substrate 1, those scarring can be erased by the right-side grinded portion 1iR. In this regard, finishing precision of a grinded surface (chamfered surface) of the glass substrate 1 can be improved.

Moreover, because a wide grinding area is used for grinding, grinding can be performed effectively and the grinding time can be shortened. In addition, even if grinding by the grindstone 41 is continuously performed, a state of the inner concave curvature of the annular end surface 41a does not change. Therefore, chamfering can be performed under constant conditions and management of the grindstone 41 becomes easy.

After completion of grinding of the top surface 1b of the glass substrate 1, similar grinding is performed on back side of the glass substrate 1 after reversing the glass substrate 1. In this manner, chamfering of the top and the bottom edges of the inner peripheral surface if of the glass substrate 1 is completed.

Although the chamfering apparatus has been described with respect to specific embodiments, the present invention is not limited to the above embodiments, and modifications and alternatives can be employed without departing from the scope of the present invention.

For example, a chamfering apparatus for a glass substrate can be prepared separately for chamfering an outer peripheral edge and for chamfering an inner peripheral edge. In this state, an apparatus body (grindstone driving unit 20 and substrate rotation-driving unit 50) can be shared in an interchangeable manner between the rotary grindstone 10 and the rotary grindstone 40, and the substrate mounting base 54 and the substrate mounting base 60. Alternatively, the substrate rotation-driving unit 50 for chamfering an outer peripheral edge and the substrate rotation-driving unit 50 for chamfering an inner peripheral edge can be separately provided in the work table T and the shared grindstone driving unit 20 can be used. In this manner, only the replacement of the rotary grindstones 10 and 40 is required.

Moreover, according to the embodiment, a rotary grindstone is made to contact with a glass substrate by shifting the rotary grindstone forward and backward. Alternatively, a rotary glass substrate can be shifted forward and backward to make a contact of the rotary glass substrate with the grindstone. Furthermore, a chamfering apparatus only for chamfering an outer peripheral surface or only for chamfering an inner peripheral surface can be used. Moreover, application of the chamfering apparatus is not limited to a magnetic disk for a hard disk drive, but it can be applied to chamfering of a recording media such as an optical disk and a magneto-optical disk. In addition, as another alternative, the chamfering apparatus can be applied to a disk-shaped glass substrate having no circular hole in the center of the glass substrate (a disk-shaped glass substrate without the circular hole 1h according to the embodiment). For example, the chamfering apparatus is applicable to chamfering of a disk-shaped glass substrate such as a wafer for a semiconductor device. Furthermore, the chamfering apparatus can include an angular adjustment unit that adjusts a tilted angle of a grindstone driving unit at a predetermined angle with a contact point of the grindstone and the glass substrate as a datum for chamfering a radius of a surface by continuously varying the tilted angles during chamfering the radius of the surface. Moreover, the chamfering apparatus can include a unit that relatively moves the glass substrate and the grindstone linearly for chamfering an angled substrate such as an LCD or a PDP.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A chamfering apparatus that chamfers an edge of an outer periphery of a glass substrate having a circular disk shape, the chamfering apparatus comprising:
   a grindstone having a cylindrical hollow end portion;
   a grindstone driving unit that rotates the grindstone around a longitudinal axis of the cylindrical hollow end portion;
   a substrate rotation-driving unit that rotates the glass substrate around a longitudinal axis of the glass substrate; and
   a pressing unit that presses the grindstone to the glass substrate such that an annular end surface of the grindstone contacts the edge of the outer periphery of the glass substrate while the cylindrical hollow end portion of the grindstone faces the outer periphery of the glass substrate, wherein the annular end surface of the grindstone is concavely curved and tilted such that an axial length of the grindstone increases from an innermost radius of the grindstone to an outermost radius of the grindstone.

* * * * *